Nov. 14, 1939.   G. STEINLEIN ET AL   2,179,764
AIR-COOLED BICYCLE MOTOR
Filed Feb. 17, 1938

Inventors
Gustav Steinlein
and
Ludwig Bruckmaier
by
Dean Fairbank & Hirsch

Patented Nov. 14, 1939

2,179,764

UNITED STATES PATENT OFFICE 2,179,764

AIR-COOLED BICYCLE MOTOR

Gustav Steinlein, Mainberg, near Schweinfurt, and Ludwig Bruckmoser, Schweinfurt, Germany Application February 17, 1938, Serial No. 191,006
In Germany February 17, 1937

3 Claims. (Cl. 180—33)

The invention relates to motor-bicycles and especially to the air-cooling of the motor mounted thereon.

In motors in which the motor is suspended in a rather low position on a bicycle and in the neighbourhood of the driving wheel rises the problem to avoid assembling dirt and moisture on the motor in order to secure regular operation in driving. When the motor would become crusted by dust and other depositions or precipitations the regular work of the motor will be impaired.

The purpose of removing such inconvenience is attained by so disposing the usual cooling ribs not only lengthwise on the motor in the direction of the counter-air current but also presenting an inclined upper outwardly sloping face, thus permitting all depositions readily to drop therefrom.

Figure 1:
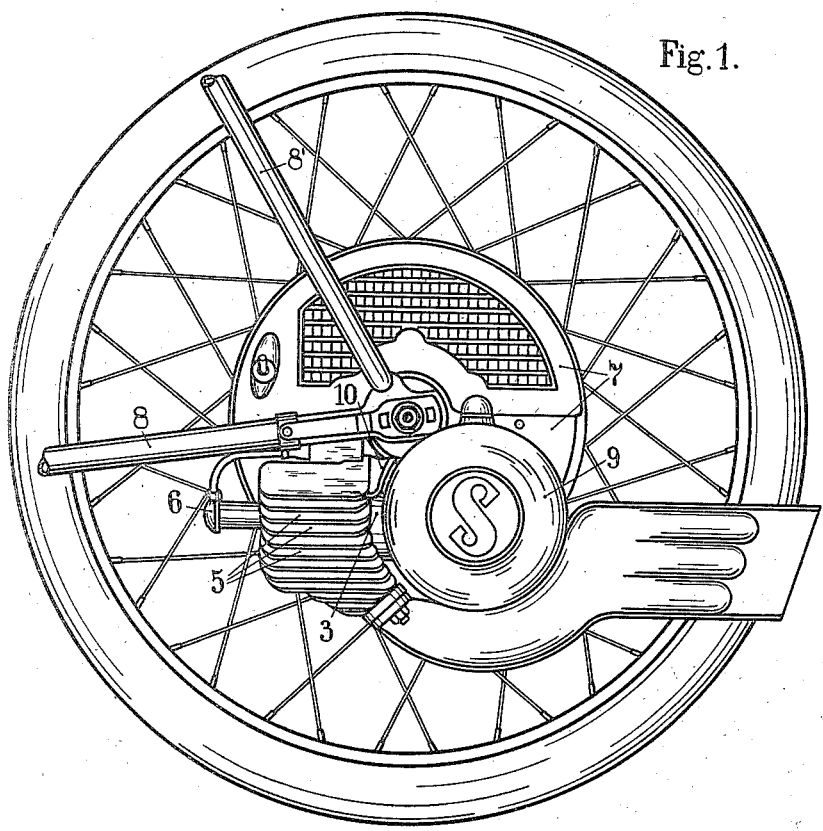
Figure 2:
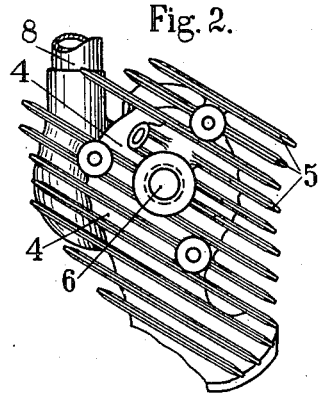

An embodiment of the invention is, by way of example, represented in the accompanying drawing in which is Fig. 1 a side elevation of the rear wheel of a bicycle and the driving engine mounted thereon, and Fig. 2 an end or head view of the engine alone.

Like numerals of both figures denote corresponding parts.

As shown in Fig. 1, the motor is suspended on the wheel axle or hub so that it depends beneath the bicycle frame 8, it being supported on the frame against reactive stress. While the other parts of the motor unit are received in a substantially circular casing 7 the cylinder 3 projects laterally from the driving wheel with its head pointing forward in the direction of travel. Cooling ribs 5 are disposed on the cylinder lengthwise and substantially parallel to the cylinder axis so that the air can easily pass between them. It is an essential feature of the invention that the cooling ribs 5 are inclined downwards from the cylinder to their outer edges, thus permitting descending of the sediments which have been thrown thereon by the front wheel. The mud will chiefly be deposited upon the uppermost rib 5, while as the other ribs are mainly overlapped by the next upper ribs they will be struck only near their outer edges. The spaces between the ribs can therefore never be closed entirely. In any case every deposit will quickly be removed by the mechanical shocks of the motor-cycle making way.

It is not essential that the surfaces of the ribs be plane; on the contrary they may be curved or otherwise shaped. The mere requirement is to present obliquely depending ways.

A spark plug fixed to cylinder head 4 is preferably protected from dirt through a covering cap 6.

As a further object of the invention the uppermost of the ribs 5 is prolonged near the casing 9 of the magneto. This is provided for with the aim of preventing precipitated rain which flows downward on the frame part 8' from entering and damaging the magneto. Preferably an elevated stop or ledge 10 which forms a moulding leading off the moisture downwards may be located at the end of the rib in proximity of the casing 9.

We claim:

1. In a motor bicycle of the type having a motor with a substantially horizontal cylinder, mounted on the driving wheel with its center of gravity below the axis of said wheel, spaced substantially parallel cooling ribs on said cylinder arranged from the top to the bottom thereof, said ribs being substantially parallel to the cylinder axis and downwardly inclined from said cylinder away from the plane of said wheel whereby water, mud, etc., falling on the cooling ribs drain downwardly away from the cylinder and the wheel.

2. In a motor bicycle of the type having a driving wheel, a horizontal gas engine mounted on said wheel with its center of gravity below the axis of said wheel, and spaced cooling ribs on said cylinder extending lengthwise thereof, and arranged from the top to the bottom of said engine, said ribs having their upper surfaces downwardly inclined from said engine away from the plane of said wheel and substantially parallel to each other whereby water, mud, etc., falling on the cooling ribs drain downwardly away from the cylinder and the wheel.

3. In a motor bicycle of the type having a driving wheel, a motor on said wheel with its center of gravity below the axis of said wheel, and having a substantially horizontal cylinder, a case enclosed magneto on the rear end of said motor and operated therefrom, and spaced cooling ribs on said cylinder extending lengthwise thereof and having their upper surfaces downwardly inclined from said cylinder and substantially parallel to each other, whereby water, mud, etc., falling on the cooling ribs drain downwardly away from the cylinder and the wheel the uppermost rib being provided at its rear end adjacent to said magneto with an elongated end portion extending to the casing of said magneto, to protect said magneto against rain.

GUSTAV STEINLEIN.
LUDWIG BRUCKMOSER.